United States Patent [19]
Fujiwara

[11] Patent Number: 5,272,816
[45] Date of Patent: Dec. 28, 1993

[54] LEVEL

[75] Inventor: Hiroyasu Fujiwara, Kyoto, Japan

[73] Assignee: Takao Manufacture Co., Ltd., Kyoto, Japan

[21] Appl. No.: 902,886

[22] Filed: Jun. 23, 1992

[30] Foreign Application Priority Data

Oct. 8, 1991 [JP] Japan .................. 3-290642

[51] Int. Cl.$^5$ .................................... G01C 9/24
[52] U.S. Cl. ........................... 33/379; 33/DIG. 11
[58] Field of Search ................. 33/379, DIG. 11

[56] References Cited

U.S. PATENT DOCUMENTS

| 1,563,321 | 12/1925 | Bedortha | 33/379 X |
| 1,730,109 | 10/1929 | Bacon | 33/379 |
| 2,646,628 | 7/1953 | Shaler | 33/379 |

FOREIGN PATENT DOCUMENTS 229817  2/1969  U.S.S.R. .................. 33/379

Primary Examiner—William A. Cuchlinski, Jr.
Assistant Examiner—Alvin Wirthlin
Attorney, Agent, or Firm—Townsend & Banta

[57] ABSTRACT

This invention relates to a level which detects a level line or horizontal surface. The mixed liquid, composed of a main agent, 2,2-dichloro-1,1,1-trifluoroethane and an additive agent, comprising one or more of a soluble agent selected from the group of methyl alcohol, ethyl alcohol, acetone, hexane, heptane, isoamyl alcohol, allyl chloride, isopropyl chloride, propyl chloride, diethyl ether, dipropyl ether, pentane, methyl hexane and silicon oil, is contained and sealed, having a ratio of about 60:40 to about 70:30 between the main agent and the additive agent, with the dyestuff in a transparent heat-resistant tube.

3 Claims, 1 Drawing Sheet

LEVEL

BACKGROUND OF THE INVENTION

A level has been utilized in various industrial fields in recent days, and it is especially practical for use in transportation equipments like automobiles or aircrafts. As is well known, it is quite common to use a bubble tube and stick type level. This type of level is devised of a liquid having a bubble, contained and sealed into a curved glass tube, wherein the bubble is adapted to stay at the center of the tube when the tube is kept horizontal.

This type of level is an indispensable apparatus for obtaining a level line or horizontal surface, and for instance, in the U.S.A., this level is required to be equipped on the upper part of the headlight of every car. Through the equipment of this level, the correct direction of the headlight is confirmed, keeping the headlight not too high or too low.

It is normally seen that the level to be equipped with the headlight contains and seals some chemical compound made from methyl alcohol or silicon oil-20, and also a very small quantity of fluorescent dyestuff is mixed therein.

The prior levels of the bubble tube and stick type, which are mainly used with the headlight of a car, have the following defects.

It is a common concern that a glass tube can expand and be broken by the heat generated by the headlight or a traffic collision may occasion the breaking of the glass tube. In the cases where the level contains methyl alcohol, since methyl alcohol is combustible, it ignites by itself in accidents, or else it can promote a fire.

On the other hand, in the case of the level containing silicon oil-20, the viscosity of this substance is so high at 20.0 centistokes (hereinafter as referred to "cSt") that it easily occasions bubble cracking when shocked which causes unstable measuring.

The above explained defects mainly occur in the glass tube and stick type level, but of course similar defects are also seen in other types of the levels.

In order to overcome these defects, the present inventor has been studying and investigating in various fields, so that he can find more preferable chemical substances which are very similar to methyl alcohol but are incombustible, and they may also satisfy the following requirements:

1. No bubble cracking occurs when the glass tube receives a shock, and even if such cracking happens, it restores immediately to the normal condition.
2. The bubble moves smoothly.
3. It can be handled safely without any danger of a toxic or poisonous quality.
4. It is smoothly soluble to dyestuff.
5. It is strongly resistant to changes in temperature.
6. It is easy to obtain.

As a result of his deep study and effort, the inventor has found a substance of chlorofluorocarbon (hereinafter as referred to "CFC") which meets the above requirements. However, this substance, CFC, is said to destroy the ozone atmosphere, and therefore it is likely to be forbidden for use in the future.

The inventor, therefore, has been continuing his study to seek another substance which satisfies all the conditions discussed above, and finally, through his investigation, he has come to know that a desirable substance can be obtained by mixing the fluorine chemical compound as a main agent with an additive agent, whereby the defects are prevented by the effect of the additive agent. Based on this knowledge, he has succeeded in providing a desirable level erasing the prior defects.

SUMMARY OF THE INVENTION

The present invention provides a level, wherein incombustible compound liquid, soluble to dyestuff, can be attained by mixing a main agent with an additive agent, and this liquid has a viscosity below 1.0 cSt and a surface tension adjusted below 30.0 dyn/cm, and finally this mixed liquid is contained and sealed in a transparent heat-resistant tube with dyestuff.

The main agent is 2,2-dichloro-1,1,1-trifluoroethane, while the additive agent comprises one or more of a soluble substance selected from the group of methyl alcohol, ethyl alcohol, acetone, hexane, heptane, isoamyl alcohol, allyl chloride, isopropyl chloride, propyl chloride, diethyl ether, dipropyl ether, pentane, methyl hexane and a silicon oil. The volume ratio between the main agent and the additive agent is 60:40 to 70:30, and this mixed agent is contained and sealed in the transparent heat-resistant tube.

DESCRIPTION OF THE PREFERRED EMBODIMENT

Figure 1:
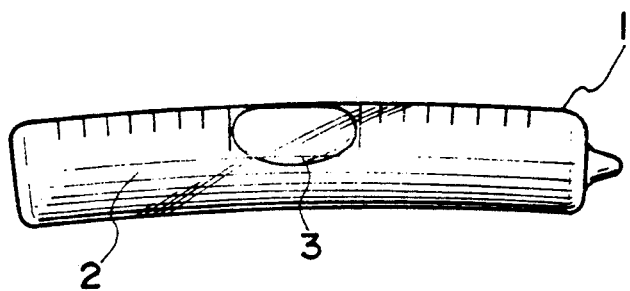
FIG. 1 is a front view of a bubble tube and stick type level developed by the present invention.

For the contained liquid in a level, this invention adopts, as a main agent, 2,2-dichloro-1,1,1-trifluoroethane (hereinafter referred as "HCFC-123"). This substance, HCFC-123, is a kind of alternative fluorine compound. The use of this substance is not regulated by law, and also it is incombustible. There is another similar fluorine compound which is 1,1-dichloro-1-fluoroethane (hereinafter referred as "HCFC-141b), but this substance is combustible in nature, and therefore it cannot be adopted for the present invention.

When HCFC-123 is solely contained and sealed in a heat-resistant tube, it expands itself by heat and the tube ruptures. In order to avoid this rupture, some additive agent must be mixed at the defined ratio, and this is a critical part of the present invention.

As an additive agent, this invention adopts one or more materials selected from the group of methyl alcohol, ethyl alcohol, acetone, hexane, heptane, isoamyl alcohol, allyl chloride, isopropyl chloride, propyl chloride, diethyl ether, dipropyl ether, pentane, methyl hexane and silicon oil.

The volume ratio between the main agent and the additive agent is now fixed at from 60:40 to 70:30. When the ratio of the additive agent is below 40% versus the main agent, the mixed liquid ensures the incombustibility by the effect of the main agent even if the additive agent has some combustible nature. The more the additive agent, by increasing its ratio, the more its original nature appears, and finally the mixed liquid becomes combustible. On the other hand, when the ratio of the additive agent is below 30% versus the main agent, the mixed liquid does not have the effect of preventing the expansion of the main agent. Therefore, the scope of the mixing ratio between the main agent and the additive agent is defined as above.

The additive agent, moreover, has an effect of adjusting the viscosity and the surface tension.

When the viscosity is high and the surface tension is large, the liquid in the heat-resistant tube invites the bubble cracking. In order to avoid such bubble cracking, the mixed liquid should be adjusted and kept at the viscosity below 1.0 cSt and at a surface tension below 30.0 dyn/cm.

As to a heat-resistant tube, this invention refers to a glass tube as a representative, and a synthetic tube can also be used when the tube has the same quality.

Other than said main agent and additive agent, a very small quantity of fluorescent dyestuff is also added in this mixed liquid. This dye has a role of aiding visual confirmation in the tube. The added quantity of this dye is about 0.1 to 0.2 grams against 500 milli-liters of liquid.

The FIG. 1 shows a front view of a level developed by this invention, and the numeral 1 is a transparent heat-resistant tube, and the numeral 2 is mixed liquid, while the numeral 3 shows a bubble.

A glass tube, 37 mm long with 6 mm diameter and bend radium R450, was prepared, in the condition of the bubble length at 8 mm in 20 degree C., into which a mixed liquid according to the present invention was contained and sealed. Thus, 5 specimens of the levels numbered from 1 to 5 were obtained and each of these 5 specimens are shown on Table 1 with each feature.

TABLE 1

| Adopted Substance Main Agent Additive Agent | Mixing % | V. & S.T. of Each Sub. cSt | V. & S.T. of Each Sub. dyn/cm | V. & S.T. of Mixed Sub cSt | V. & S.T. of Mixed Sub dyn/cm |
|---|---|---|---|---|---|
| S.1 HCFC-123 | 65 | 0.43 | 15.0 | 0.52 | 18.2 |
| Methyl Alcohol | 35 | 0.68 | 24.0 | | |
| S.2 HCFC-123 | 68 | 0.43 | 15.0 | 0.51 | 17.9 |
| Methyl Alcohol | 32 | 0.68 | 24.0 | | |
| S.3 HCFC-123 | 61 | 0.43 | 15.0 | 0.53 | 18.5 |
| Methyl Alcohol | 39 | 0.68 | 24.0 | | |
| S.4 HCFC-123 | 65 | 0.43 | 15.0 | 0.39 | 16.9 |
| Hexane | 35 | 0.31 | 20.4 | | |
| S.5 HCFC-123 | 65 | 0.43 | 15.0 | 0.51 | 15.3 |
| Silicon Oil | 35 | 0.65 | 15.9 | | |

*Notes for the abbreviations for the above Table:
S = Specimen S.1 means a Specimen 1.
V = Viscosity
S.T. = Surface Tension
Sub = Substance For the above specimens, the following tests were performed.

Test Methods:

*1: Tilt the specimen at 5 degrees, then the bubble moves to one end naturally. The time of speed required for the movement of the bubble from its original place to the end was measured.

*2: The specimen was dropped from 30 cm high above, onto a floor rubber sheet with 2 mm thickness, and then the condition of the bubble was observed.

*3: The core of an alcohol lamp, having 5 mm length and 6 mm diameter, was soaked into the mixed liquid exactly as contained in the specimen, and thus combustibility was detected.

*4: The specimen was put into the heating fireplace which was heated up to 150 degree C. from the normal temperature for 40 minutes, and the specimen was kept there for 6 hours, and then it was stabilized to restore to normal temperature for one hour, and after this procedure, the rupture test was performed.

The results of the above test performances are shown on Table 2 as below.

TABLE 2

| | *1.B. Movement Speed | *2.B. Cracking | *3. Combustible | *4 Rupture |
|---|---|---|---|---|
| S.1 | 3.8 sec | None | Non-flammable | None |
| S.2 | 3.6 sec | None | Non-flammable | None |
| S.3 | 4.0 sec | None | Non-flammable | None |
| S.4 | 3.5 sec | None | Non-flammable | None |
| S.5 | 3.8 sec | None | Non-flammable | None |

*Notes for the abreviation for the above Table:
S = Specimen
B = Bubble

Next, the other 5 specimens numbered from 6 to 10 were prepared containing other different liquid as comparative specimens, and they were subject to the same testings. Table 3 shows the features of the adopted substances, while Table 4 indicates the test results.

TABLE 3

| Adopted Substance Main Agent Additive Agent | Comparative Specimens Mixing % | V. & S.T. of Each Sub. cSt | V. & S.T. of Each Sub. dyn/cm | V. & S.T. of Mixed Sub cSt | V. & S.T. of Mixed Sub dyn/cm |
|---|---|---|---|---|---|
| S.6 Methyl Alcohol | 100 | 0.68 | 24.0 | — | — |
| S.7 Silicon-20 | 100 | 20.0 | 20.2 | — | — |
| S.8 HCFC-123 | 75 | 0.43 | 15.0 | 0.49 | 17.3 |
| Methyl Alcohol | 25 | 0.68 | 24.0 | | |
| S.9 HCFC-123 | 55 | 0.43 | 15.0 | 0.54 | 19.1 |
| Methyl Alcohol | 45 | 0.68 | 24.0 | | |
| S.10 HCFC-141b | 65 | 0.40 | 11.5 | 0.44 | 18.0 |
| Methyl Alcohol | 35 | 0.68 | 24.0 | | |

*Notes for the abbreviations for the above Table:
S = Specimen
V = Viscosity
S.T. = Surface Tension
Sub = Substance

TABLE 4

| | Comparative Test Performances | | | |
|---|---|---|---|---|
| | B. Movement | B. Cracking | Combustible | Rupture |
| S.6 | 4.6 sec. | None | Flammable | None |
| S.7 | 6.4 sec. | Occurred, Restores 6-m later | Flammable | None |
| S.8 | 3.6 sec. | None | Non-flammable | Ruptured after 30-m by heat |
| S.9 | 4.1 sec. | None | Sometimes Flammable | None |
| S.10 | 3.8 sec. | None | Flammable weakly | None |

*Notes for the abbreviations for the above Table:
S = Specimen
B = Bubble
m = minutes 6-m means 6 minutes.

On checking the Tables 1 to 4, it is clearly understood that the present level obtained by the present invention demonstrates satisfactory results.

This level adopts HCFC-123 which has the similar beneficial features of solid methyl alcohol, and also this HCFC-123 is incombustible which is different from methyl alcohol.

The Specimen 8 of the Table 4 shows unsatisfactory result for the rupture test, and this is caused by the expansion of HCFC-123 when heated. However, in this invention, the rupture can be prevented by mixing methyl alcohol or other additive agents to the required percentage, so that the added substance can restrain the expansion of HCFC-123 in the due time.

In the present invention, the viscosity and the tension surface of the mixed liquid are defined for the following reasons: When the viscosity of the mixed liquid exceeds over 1.0 cSt, the bubble does not move smoothly and is easily cracked. On the other hand, when the surface tension exceeds over 30.0 dyn/cm, bubble cracking is promoted. When the mixed liquid is kept at a viscosity below 10.0 cSt and also kept in its surface tension below 30.0 dyn/cm, the bubble moves quite smoothly and the bubble cracking is suppressed. Even if such cracking happens, it immediately restores to its normal condition.

For practical use, it is recommended to define the viscosity in the range of about 0.9 cSt to about 0.2 cSt and the surface tension in the range of about 26.0 dyn/cm to about 10.0 dyn/cm.

The level developed by the present invention has been now explained as above, and it should be clearly understood that this level, when broken, does not ignite by itself nor promotes a incurred fire further, since the contained liquid is incombustible in its nature. At the same time, the viscosity and the surface tension has been adjusted and kept in the proper scope, any external or internal shock does not occasion any bubble cracking, and even if such cracking happens, it is immediately corrected and restored to a normal condition. The additive agent is devised to restrain the expansion of the main agent, and therefore rupture is not a concern.

Thus, the present invention can provide an idealistic level of the bubble tube and stick type, wherein prevented are the dreadful accidents which were unavoidable in the level developed by the prior arts for automobiles and aircrafts.

What is claimed is:

1. A level comprising a transparent heat-resistant tube, wherein mixed liquid having a main agent, 2-2-dichloro-1,1,1, 1-trifluoroethane and also having an additive agent to restrain the expansion of the main agent and to adjust the viscosity and the surface tension, is contained and sealed with dyestuff in the tube, said additive agent comprising one or more soluble agent selected from the group of methyl alcohol, ethyl alcohol, acetone, hexane, heptane, isoamyl alcohol, allyl chloride, isopropyl chloride, propyl chloride, diethyl ether, dipropyl ether, pentane, methyl hexane and silicon oil, the ratio of said mixed liquid between said main agent and said additive agent being from about 60:40 to about 70:30.

2. A level according to claim 1, wherein the viscosity of said mixed liquid is below about 1.0 cSt and the surface tension is below about 30.0 dyn/cm.

3. A level according to claim 1, wherein said dyestuff is fluorescent dye.

* * * * *